(12) United States Patent
Minary-Jolandan et al.

(10) Patent No.: US 12,030,210 B2
(45) Date of Patent: Jul. 9, 2024

(54) ADDITIVE MANUFACTURING OF POLYMER CERAMICS

(71) Applicant: Board of Regents, The University of Texas System, Austin, TX (US)

(72) Inventors: Majid Minary-Jolandan, Dallas, TX (US); Mohammadreza Mahmoudi, Dallas, TX (US); Scott R. Burlison, Fredericksburg, TX (US); Chao Wang, Plano, TX (US); Salvador Moreno, Dallas, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 39 days.

(21) Appl. No.: 17/304,443

(22) Filed: Jun. 21, 2021

(65) Prior Publication Data

US 2021/0394391 A1    Dec. 23, 2021

Related U.S. Application Data

(60) Provisional application No. 63/211,897, filed on Jun. 17, 2021, provisional application No. 63/041,364, filed on Jun. 19, 2020.

(51) Int. Cl.
*B28B 1/00* (2006.01)
*B33Y 10/00* (2015.01)
(Continued)

(52) U.S. Cl.
CPC .............. *B28B 1/001* (2013.01); *B33Y 10/00* (2014.12); *B33Y 40/20* (2020.01); *B33Y 70/00* (2014.12);
(Continued)

(58) Field of Classification Search
None
See application file for complete search history.

(56) References Cited

U.S. PATENT DOCUMENTS 10,005,235 B2 *   6/2018  Millar ................... B29C 64/40
10,150,258 B2 * 12/2018  Feinberg ............... B29C 64/40
(Continued)

OTHER PUBLICATIONS

Sigma-Aldrich, Product Information for Silica, fumed, Catalog No. S5505, 2012, Sigma-Aldrich (Year: 2012).*
(Continued)

*Primary Examiner* — Xiao S Zhao
*Assistant Examiner* — Nicholas J Chidiac
(74) *Attorney, Agent, or Firm* — Yee & Associates, P.C.

(57) ABSTRACT

Scalable 3D-printing of ceramics includes dispensing a preceramic polymer at the tip of a moving nozzle into a gel that can reversibly switch between fluid and solid states, and subsequently thermally cross-linking the entire printed part "at-once" while still inside the same gel. The solid gel, including mineral oil and silica nanoparticles, converts to fluid at the tip of the moving nozzle, allows the polymer solution to be dispensed, and quickly returns to a solid state to maintain the geometry of the printed polymer both during printing and the subsequent high temperature (160° C.) cross-linking. The cross-linked part is retrieved from the gel and converted to ceramic by high temperature pyrolysis. This scalable process opens new opportunities for low-cost, high-speed production of complex 3-dimensional ceramic parts, and will be widely used for high temperature and corrosive environment applications, including electronics and sensors, microelectromechanical systems, energy, and structural applications.

14 Claims, 13 Drawing Sheets

(51) Int. Cl.
    *B33Y 40/20*           (2020.01)
    *B33Y 70/00*           (2020.01)
    *B33Y 80/00*           (2015.01)
    *C04B 35/571*         (2006.01)
    *C04B 35/589*         (2006.01)

(52) U.S. Cl.
    CPC ............ *B33Y 80/00* (2014.12); *C04B 35/571* (2013.01); *C04B 35/589* (2013.01)

(56) References Cited

U.S. PATENT DOCUMENTS

| | | | |
|---|---|---|---|
| 10,384,393 B2* | 8/2019 | Xu | C04B 35/589 |
| 10,730,203 B2* | 8/2020 | Goodman | B33Y 10/00 |
| 10,953,605 B2* | 3/2021 | Tibbits | B29C 64/118 |
| 2016/0067918 A1* | 3/2016 | Millar | B29C 64/106 425/375 |
| 2016/0167312 A1* | 6/2016 | Feinberg | A61L 27/04 264/239 |
| 2017/0341297 A1* | 11/2017 | Xu | C04B 35/589 |
| 2018/0281295 A1* | 10/2018 | Tibbits | B29C 64/106 |
| 2019/0160704 A1* | 5/2019 | Goodman | B32B 18/00 |
| 2020/0308062 A1* | 10/2020 | Klett | B33Y 40/20 |
| 2021/0138737 A1* | 5/2021 | Tibbits | B29C 64/40 |
| 2021/0178702 A1* | 6/2021 | Tibbits | B33Y 10/00 |

OTHER PUBLICATIONS

Yifei Jin, Kaidong Song, Nevada Gellermann, and Yong Huang, Printing of Hydrophobic Materials in Fumed Silica Nanoparticle Suspension, 2019, ACS Applied Materials & Interfaces, 2019 11 (32), 29207-29217 DOI: 10.1021/acsami.9b07433 (Year: 2019).*

"Materials, Keeping Cool . . . Even at 1,400° C," Additive Manufacturing, vol. 10, No. 2, Mar. 2021, copyright 2023, Gardner Business Media, Inc., 44 pages.https://am.mydigitalpublication.com/march-2021?m=59260&i=695077&p=1&ver=html5.

Mahmoudi et al., "3-Dimensional Printing of Ceramics through "Carving" a Gel and "Filling in" the Precursor Polymer," ACS Applied Materials & Interfaces, vol. 12, No. 28, Jun. 17, 2020, 26 pages.

\* cited by examiner

FIG. 2D CAD IMAGE

FIG. 2C PYROLYZED

FIG. 2B CROSS-LINKED

FIG. 2A PRINTED PRECERAMIC POLYMER INSIDE THE GEL

| GEOMETRY | PRINTING TIME(S) |
|---|---|
| SMALL HELIX | 8 |
| LARGE TRUSS-BEAM STRUCTURE | 115 |
| GRID 2D | 55 |
| CONE HELIX | 28 |
| VASE | 90 |
| SMALL TRUSS-BEAM STRUCTURE | 30 |
| GRID 3D | 55 |

FIG. 12

| ELEMENT (AT. %) | C | O | Si | Au | Pd | COMPOSITION |
|---|---|---|---|---|---|---|
| CAST SURFACE | 35 | 48.04 | 16.12 | 0.47 | 0.37 | $SiO_3C_{2.2}$ |
| PRINT SURFACE | 32.17 | 54.59 | 11.80 | 0.77 | 0.68 | $SiO_{4.6}C_{2.7}$ |
| CAST CROSS-SECTION | 39.15 | 44.38 | 15.58 | 0.49 | 0.39 | $SiO_{2.8}C_{2.5}$ |
| PRINT CROSS-SECTION | 44.64 | 39.45 | 14.01 | 0.98 | 0.93 | $SiO_{2.8}C_{3.18}$ |

FIG. 13

ADDITIVE MANUFACTURING OF POLYMER CERAMICS

CROSS REFERENCES TO RELATED APPLICATIONS

Referring to the application data sheet filed herewith, this application claims a benefit of priority under 35 U.S.C. 119(e) from provisional patent applications U.S. Ser. No. 63/041,364, filed Jun. 19, 2020 and U.S. Ser. No. 63/211,897, filed Jun. 17, 2021, the entire contents of both of which are hereby expressly incorporated herein by reference for all purposes.

STATEMENT OF GOVERNMENT INTEREST

This invention was made with government support under Grant No. CMNMI1930621 awarded by the National Science Foundation. The government has certain rights in the invention.

BACKGROUND

Prior art additive manufacturing (AM), sometimes called 3-D printing, is known to those skilled in the art. For instance, a conventional additive manufacturing article is typically produced by joining materials to make objects from 3D model data, usually layer upon layer, as opposed to subtractive manufacturing methodologies.

Achieving a viable process for 3-dimensional printing of ceramics is a sought-after goal in a wide range of fields including electronics and sensors for harsh environments, microelectromechanical devices, energy storage materials, and structural materials, among others. Low laser absorption of ceramic powders renders available additive manufacturing (AM) technologies for metals not suitable for ceramics. Polymer solutions that can be converted to ceramics (pre-ceramic polymers) offer a unique opportunity to 3D-print ceramics, however, due to the low viscosity of these polymers, so far, their 3D printing has only been possible by combining them with specialized light-sensitive agents and subsequently cross-linking them layer by layer by rastering an optical beam. The slow rate, lack of scalability to large specimens, and specialized chemistry requirements of this optical process are fundamental limitations.

Scientists across several fields including electronics and sensors for harsh environments, microelectromechanical devices, energy storage materials, and structural materials are interested in a viable process for 3-dimensional (3-D) printing of ceramics. This is because of several factors: the traditional method of ceramic manufacturing based on powder consolidation and sintering is costly, casting and machining ceramics is nontrivial as opposed to metals and polymers[1,2]; additionally, the extremely high melting point of most ceramics, in addition to their low laser absorption, renders available additive manufacturing (AM) technologies for metals non-applicable to or not suitable for ceramics.

Various methods for AM of ceramics have been reported such as photolithography, binder jetting, and laser sintering. The photolithography process involves selective curing of a photosensitive resin containing ceramic particles[3,4]. In the binder jetting process, a liquid binder agent is selectively deposited onto ceramic particles[5]. In the laser sintering process, ceramic powder is selectively fused using a laser beam[6,7]. These processes are all layer-by-layer, powder-based and face several challenges such as porosity after removal of the binder or resin, which makes the consolidation step to achieve a dense 3D-printed part difficult. Most ceramics have low laser absorption, which makes laser-based processes challenging. In addition, laser-based processes generate large thermal gradient in the 3D-printed part, which is the driving force for crack formation. Porosity and cracks in 3D-printed ceramics result in low strength. These processes are often slow and require a binder removal post-processing step. Free-form extrusion of ceramic particle-based slurries is another method for AM of ceramics[8]. This process prints a composite of a binder and ceramic particles, and requires binder removal post-processing, which often leaves behind a porous structure.

The polymer-derived ceramics (PDCs), a class of ceramics that are obtained by pyrolysis of polymer precursors 9, lend themselves to AM processes. This is because in their polymer state they are suitable for shaping such as printing, and the subsequent cross-linking locks the printed geometry[10-12] PDCs were introduced in the 1960s and include SiC, SiOC, $Si_3N_4$, BN, AlN, SiCN, BCN, among others. PDCs are mostly used for infiltration of ceramic matrix composites, and ceramic fiber synthesis. In addition, their electrical conductivity, luminescence, and piezoresistivity make them attractive for functional applications[13]. By having Si-rich and C-rich nano-sized domains, PDCs are stable against creep, oxidation, crystallization, or phase separation up to 1500° C. or higher temperature[9]. The pyrolysis temperature of PDCs is in the range of 1000° C.-1300° C., which is lower than temperatures (>1600° C.) typically used in classic ceramic powder-based sintering.

Layer-by-layer, selective curing of a photosensitive slurry via a dynamic mask exposure was reported for AM of dense alumina ceramics by Schwentenwein et al.[14]. This process uses a photocurable ceramic suspension comprised of high-purity alumina powder dispersed in a light-sensitive organic matrix. The organic matrix includes of a photoinitiator, monomers based on methacrylate chemistry and additives. After debinding and sintering process, the printed parts showed a density corresponding to 99.3% of the theoretical density of alumina, which is an indication of excellent densification. In 2015, Zanchetta et al. reported layer-by-layer stereolithography of SiOC ceramic micro-components using an engineered photosensitive methyl-silsesquioxane preceramic polymer 13. This report was the first direct fabrication of 3D high performance ceramics from preceramic poly-siloxanes with high ceramic yield. The engineered preceramic precursor started from a commercially available silicone (SILRES MK), and an organically modified silicon alkoxide 3-(trimethoxysilyl) propyl methacrylate. In 2015, Eckel et al. reported AM of PDCs via stereolithography (SLA) and self-propagating photo-polymerization techniques[15]. Ultra-violet (UV)—active preceramic monomers were obtained by incorporation of UV-sensitive side-groups (photoinitiators) to the backbone of the precursor polymer. Cross-linked polymer patterns were generated by scanning using a UV beam, which were subsequently post-cured by thermal treatment or additional UV exposure. The printed and cured polymer was pyrolyzed to obtain virtually pore-free solid ceramic parts. The unpolymerized resin was recycled and reused. These processes based on photosensitive slurry or UV-sensitive resin require specialized chemistry. Additionally, SLA is rather slow since at each scan 30-100 µm slices are built. The ridges generated from layer-by-layer scanning process on the surface of the printed ceramic part are surface flaws and may result in stress concentrations, which is detrimental for ceramics given their low fracture toughness. On the other hand, self-propagating photo-polymerization is limited to structures with linear features extending from the exposure surface (such as lattices, and honeycombs). Recently, 3D nanofabrication of SiOC ceramic structures using two-photon lithography (2PL) with an engineered printing configuration by starting from a selected preceramic formulation was demonstrated to achieve 3D complex architectures with size on the order of 100 microns in the z-direction, with 450 nm resolution[16].

Heretofore, the requirements of speed, scalability, and non-specialized chemistry referred to above have not been fully met. In view of the foregoing, there is a need in the art for a solution that simultaneously solves this (both of these)(all of these) problem(s).

BRIEF DESCRIPTION OF THE DRAWINGS AND TABLES

The novel features believed to be characteristic of the illustrative embodiments are set forth below. The illustrative embodiments, however, and further objectives and features thereof, will best be understood by reference to the following detailed description when read in conjunction with the accompanying drawings, including:

FIGS. 1A-1G illustrate 3D-printing polymer-derived ceramics inside a support gel. (FIG. 1A) The process flow including printing a preceramic polymer inside the support gel, and "one-step" cross-linking, while the printed part is still inside the gel, followed by retrieval of the cross-linked polymer from gel and pyrolysis inside the furnace. (FIG. 1B) The schematic shows close-up view of polymer dispensing from the nozzle tip into the gel. (FIG. 1C)-(FIG. 1E) Photos of the several printed geometries including a honeycomb, an airfoil, two helical springs, and two truss-beams inside the gel. (FIG. 1F) The CAD image and photo of the truss-beam structure after pyrolysis. (FIG. 1G) The final printed specimen shown over a flame with T~1400° C. The change in the sample weight was ~0.6% for 2-minute hold on the flame.

FIGS. 2A-2K illustrate sample 3D printed geometries. (FIG. 2A)-(FIG. 2C) A helix inside the gel, after cross-linking, and after pyrolysis, respectively. (FIG. 2D) and (FIG. 2E) The CAD image and a photo of a printed hollow vase. FIG. 2F, FIG. 2H, and FIG. 2J cross-linked, and FIG. 2G, FIG. 2I, and FIG. 2K pyrolyzed samples. Printing duration for the parts ranged within ~8-115 seconds (provided in FIG. 12).

FIGS. 3A-3D illustrate rheological properties of the preceramic polymer and the support gel. (FIG. 3A) Comparison of the preceramic polymer viscosity to other common liquids. The inset shows a bottle of the ceramic polymer solution. (FIG. 3B)-(FIG. 3D) The rheological properties of the support gel (FIG. 3B) storage and loss moduli vs. frequency; (FIG. 3C) shear stress vs. shear rate, (FIG. 3D) viscosity vs. shear rate. The inset in C shows a container of the support gel. (1 cP=$10^{-3}$ Pa·s).

(FIG. 4A) The thermogravimetric analysis (TGA/DTG) response, and (FIG. 4B) differential scanning calorimetry (DSC) response for the preceramic polymer. (FIG. 4C) The Weibull plot for the strength of 3D-printed ceramic. n=33.

Figure 1A:
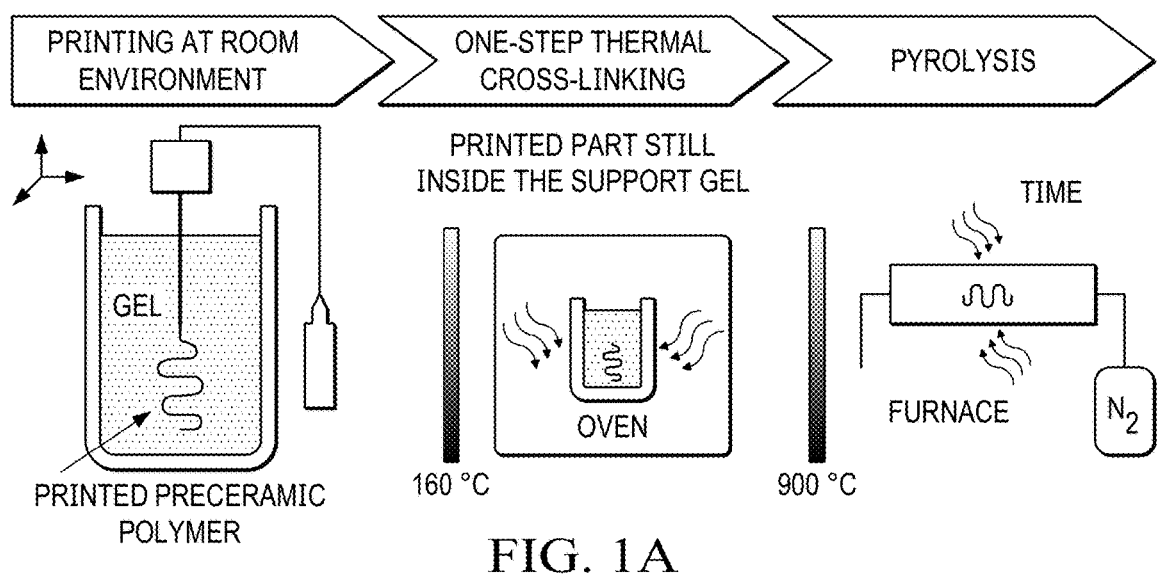

FIG. 12 indicates printing duration of selected geometries shown in FIG. 2.

FIG. 13 shows EDS elemental analysis and composition for the cast and printed specimens.

SUMMARY

There is a need for the following embodiments of the present disclosure. Of course, the present disclosure is not limited to these embodiments.

According to an embodiment of the present disclosure, method for fabricating a structure having at least two dimensions, the method comprises: providing support material within which the structure is fabricated; wherein the provided support material is stationary at an applied shear stress level below a threshold shear stress level and flows at an applied shear stress level at or above the threshold shear stress level during fabrication of the structure; and wherein the provided support material is configured to mechanically support at least a portion of the structure and to prevent deformation of the structure during the fabrication of the structure; depositing, into the support material, structure material to form the fabricated structure, wherein the depositing comprises applying a shear stress level above the threshold shear stress level to a portion of the support material; wherein the deposited structure material is suspended in the support material at a location where the structure material is deposited; wherein the structure material comprises a fluid that transitions to a solid or semi-solid state after deposition of the structure material; wherein the structure material is substantially free of photocuring agents and rheology modifiers; and removing the support material to release the fabricated structure from the support material.

According to another embodiment of the present disclosure, a fabricated structure having at least two dimensions and formed by a printing operation, the fabricated structure comprises: a body comprising a ceramic material; and wherein the fabricated structure is substantially free of photocuring agents and rheology modifiers.

According to another embodiment of the present disclosure, a method comprises: 3-D printing a preceramic polymer material within a support bath comprising a thixotropic gel; to form a shape; then curing the preceramic polymer material while the preceramic polymer material is still in the support bath; and then retrieving the shape from the support bath, wherein the preceramic polymer material is substantially free of photocuring agents and rheology modifiers.

These, and other, embodiments of the present disclosure will be better appreciated and understood when considered in conjunction with the following description and the accompanying drawings. It should be understood, however, that the following description, while indicating various embodiments of the present disclosure and numerous specific details thereof, is given for the purpose of illustration and does not imply limitation. Many substitutions, modifications, additions and/or rearrangements may be made within the scope of embodiments of the present disclosure, and embodiments of the present disclosure include all such substitutions, modifications, additions and/or rearrangements.

DETAILED DESCRIPTION

The descriptions of the various embodiments of the present invention are presented in the attached manuscript which serves as a specification for purposes of illustration, but are not intended to be exhaustive or limited to the embodiments disclosed or claimed. Many modifications and variations will be apparent to those of ordinary skill in the art without departing from the scope and spirit of the described embodiment. The terminology used herein is chosen to best explain the principles of the embodiment, the practical application or technical improvement over technologies found in the marketplace, or to enable others of ordinary skill in the art to understand the embodiments disclosed here.

Embodiments of this disclosure are a new approach for high-speed 3D printing of polymer derived ceramics that does not require UV or photo-curing or rheology modifiers, and results in binder-free printed parts. In this process, a 3D-printed precursor ceramic polymer is thermally cured in a single step at the end of the printing process, as opposed to layer-by-layer curing. This method relies on controllable interactions between two liquids, the precursor of the main structure (such as a resin) and the liquid support bath. While the former can be considered a Newtonian fluid, the latter is a so-called "yield stress fluid", which switches reversibly from a semi-solid to a liquid when subjected to sufficiently high shear stress to allow for extrusion of the liquid ceramic polymer precursor, and retains the printed part shape in the wake of the nozzle when shear stress provide by the moving nozzle is removed by virtue of the nozzle moving away. In this printing process, the shear stress is provided by the nozzle motion. The liquid ceramic polymer precursor is then cured (cross-linked) inside the support bath and retrieved for subsequent processing steps. Polymer derived ceramics require thermally induced curing at elevated temperatures (>120° C.), and are sensitive to surface defects. Embodiments of this disclosure can include additive manufacture of SiOC (silicon oxycarbide) ceramics in a yield-stress fluid support bath that is based on mineral oil and silica nanoparticles, which makes it suitable for high temperature curing required for SiOC, and can further be applied to other polymer derived ceramic types including SiC, SiCN, and $Si_3N_4$.

Embodiments of this disclosure present a new process for additive manufacturing of polymer-derived ceramics using a thixotropic support bath comprising a thixotropy gel. Thixotropic is intended to mean a progressive decrease in viscosity with respect to time for a constant applied shear stress, followed by a gradual recovery when the stress is removed. In contrast, dilatancy is characterized by increasing shear force causing increased resistance. Consequently, a thixotropic gel is intended to mean a gel that manifests a reversable decrease in viscosity with respect to time upon application of a constant shear stress. A gel is intended to mean a coherent mass comprising a liquid in which particles too small to be seen in an ordinary optical microscope are dispersed or arranged in a fine network throughout the mass.

After printing and cross-linking in the same bath, the printed parts are retrieved from the bath and pyrolyzed to final ceramic part. The one-step curing process after the printing process is advantageous for mechanical properties since no-interlayer interfaces are generated in the process.

Although embodiments of this disclosure focus on SiOC, the process can be readily extended to other preceramic polymers. There are many different types of preceramic polymers such as SiOC, SiC, SiCN, SiBCN, among others. The preceramic polymer function as the precursor to the final ceramic, after it goes through cross-linking and pyrolysis. The properties of the final ceramic depend on the composition and properties of the preceramic polymer. The process can be also easily extended to ceramic composites by adding chopped ceramic fibers and/or functional nanoparticles. Embodiments of this disclosure focus on printing lab-scale components, but this process can be readily scaled up. The support gel is made of low-cost and commercially available mineral oil and silica nanoparticles. A large container of the bath can be easily prepared. The nozzle size can be varied to obtain components with smaller or larger sizes as required. Larger ovens and furnaces can be used for curing and pyrolysis steps.

Figure 1B:
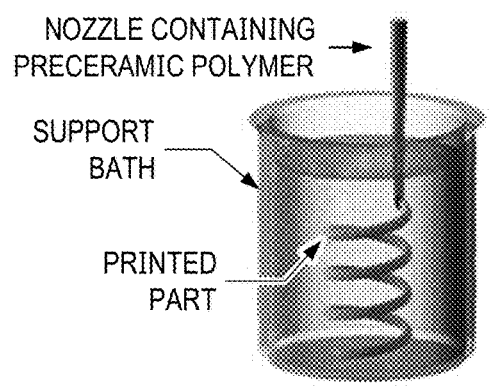

The schematic in FIG. 1A shows the overall process flow, which includes printing the preceramic polymer inside the support bath at room environment, cross-linking the printed part while still inside the support bath in an oven at temperature ~160° C., followed by retrieval of the cured specimen, and finally pyrolysis in a furnace at ~900° C. The magnified view of the nozzle and bath is shown in FIG. 1B. The printer includes an injection system that controls the flow rate of the precursor polymer solution, and a delta-type XYZ positioning system. The trajectory and nozzle translational speed are controlled by G-code.

Embodiments of this disclosure can include a yield stress support bath that can sustain its required rheological properties to support the printed geometry both at room environment as well as at the temperature required for cross-linking (~160° C.). This temperature limit excludes aqueous yield stress bath due to water boiling, which will break up printed parts. Details of the materials for the bath and the preceramic polymer solution are presented in the materials and methods section. The support bath includes mineral oil and silica nano-particles. The silica nanoparticles are rheology modifiers in this bath, given their network structure. Pure mineral oil does not have the required property to switch between the solid and fluid states, without addition of silica nano-particles. The capability of switching between the solid and liquid states is the key in this 3D printing process, since otherwise the printed preceramic polymer cannot be extruded or its shape cannot be maintained. The reported bath composition was determined by an iterative process. Rheological properties of the supporting bath were tuned by changing the volume fraction of the silica nanoparticles. Increasing the volume fraction of the fumed silica in the suspension led to the formation of sol, pre-gel, and gel. One important consideration in this process was to avoid gravitational instability, which required the support bath to be viscous enough to keep the preceramic polymer in the desired shape and to be stable during the crosslinking at higher temperature. The rheological properties of the bath are discussed later in the manuscript. The thermogravimetric analysis confirmed that the oil bath was stable up to 200° C. (the boiling point of the mineral oil is ~310° C.).

Figure 1C:
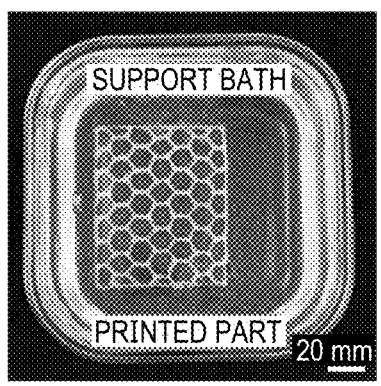
Figure 1D:
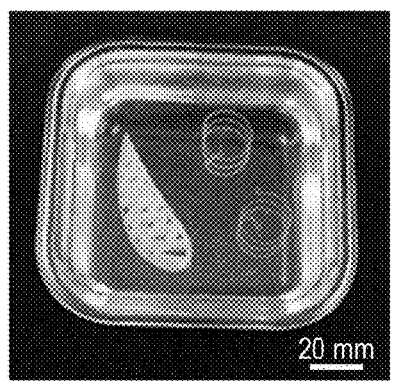
Figure 1E:
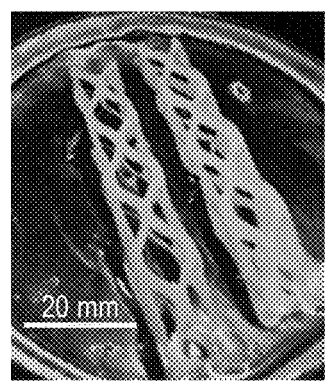
Figure 1F:
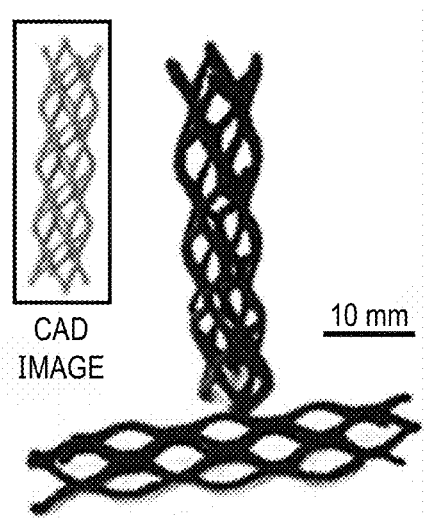
Figure 1G:
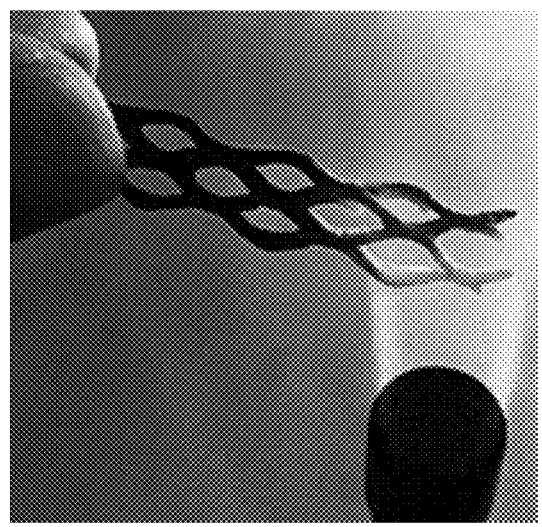
Figure 2K:
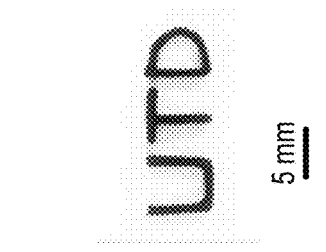
Figure 2J:
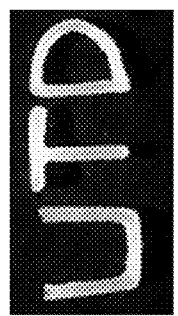
Figure 2E:
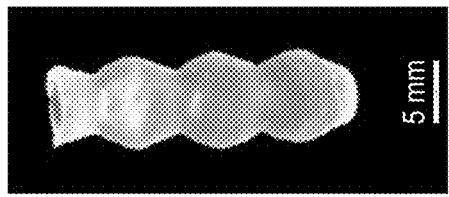
Figure 2I:
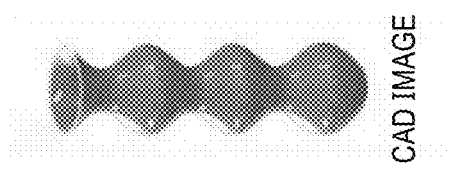
Figure 2I:
Figure 2H:
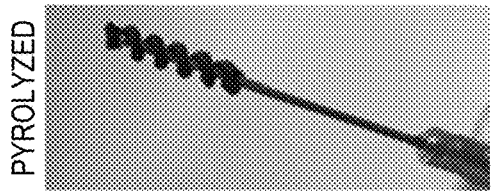
Figure 2H:
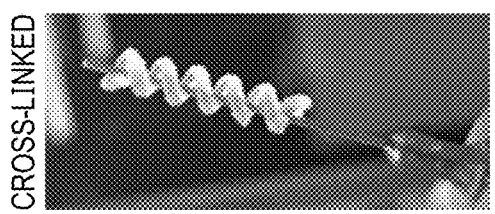
Figure 2H:
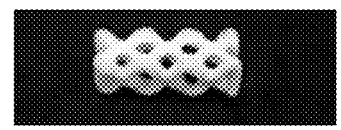
Figure 2G:
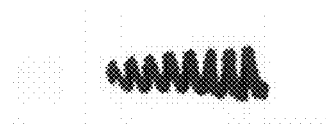
Figure 2F:
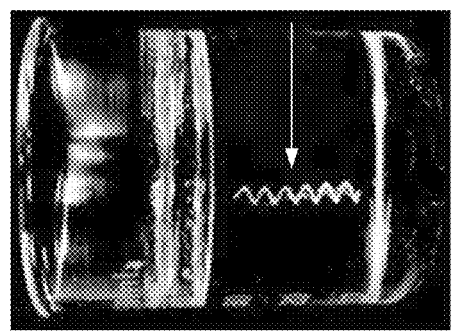
Figure 2F:
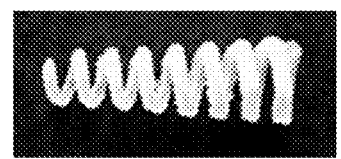

FIGS. 1C-1E show photos of the several printed geometries including a honeycomb, an airfoil, two helical springs, and two truss-beams inside the gel. One advantage of this bath is its transparency, such that the printing process can be monitored in situ. After curing, printed parts are readily retrieved from the support bath, and rinsed with running ethanol for subsequent processing. FIG. 1F shows the truss-beams after pyrolysis. During pyrolysis at ~900° C. in a nitrogen environment, polymer-to-ceramic transformation occurs. The polymer-to-ceramic transformation is accompanied by release of volatile species ($CH_4$, $H_2$, $CO_2$, $H_2O$, and hydrocarbons), and results in shrinkage in the dimensions of the printed part, which is typical of all preceramic polymers. The linear shrinkage percentage was estimated, by image analysis of before and after pyrolysis, to be ~15%. FIG. 1G shows a pyrolyzed part held over a flame, which demonstrate potential application of the process to print structures for harsh environment. The temperature of the flames was ~1400° C. The change in the sample weight was ~0.6% for 2-minute hold on the flame.

FIGS. 2A-2K show several 3D-printed geometries after curing and pyrolysis. These samples include a helix, a hollow vase, a cone helix, a 3D grid structure, and "UTD" letters. The printing duration for these parts are provided in FIG. 12, which range from ~8-115 seconds, showing the rapid printing speed of the process. Subsequent curing and pyrolysis can be done at once for all parts.

Figure 3B:
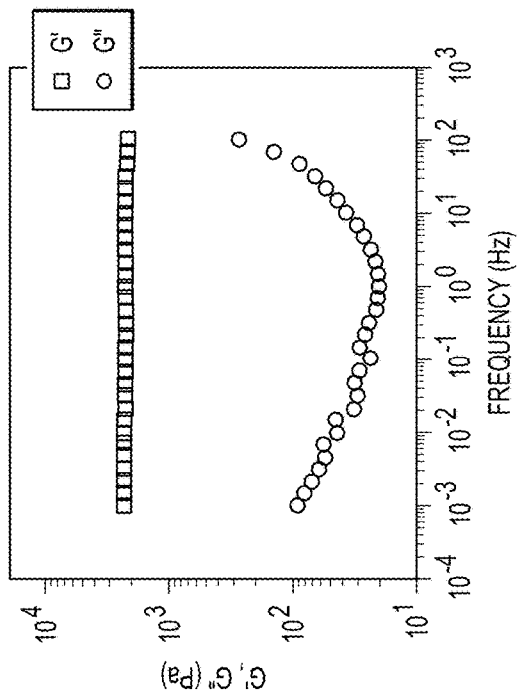
Figure 3D:
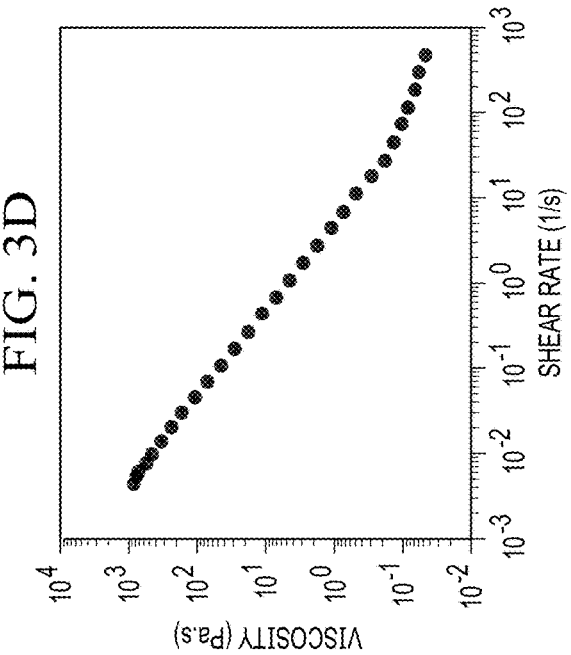
Figure 3A:
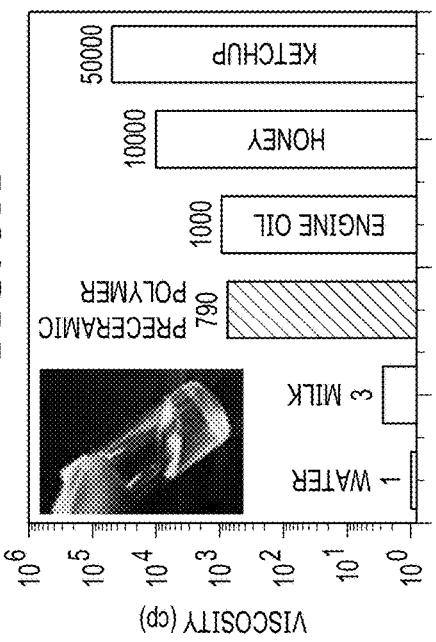

The inset in FIG. 3A shows the preceramic polymer in a vial. The viscosity of the polymer is ~790 cP (1 cP=$10^{-3}$ Pa·s). In FIG. 3A, this viscosity is compared to other fluids such as engine oil and honey to show the rather low viscosity of the preceramic polymer. As an example, the preceramic polymer solution is more than 13-time less viscous than honey. The polymer solution used in this study does not contain any rheology modifiers or additives as opposed to all other previously reported methods for such low viscosity polymers[13, 20]. Due to its low viscosity, it cannot be directly extruded without support, as it cannot maintain its shape. As such the two most common methods for 3D printing of preceramic polymers are using layer-by-layer photo-curing and mixing with other additives and rheology modifiers to increase the viscosity.

Embodiments of this disclosure can include a preceramic polymer and/or a structure material that is (are) substantially free of photocuring agents and rheology modifiers. Photocuring agents are intended to mean light-activated or photoinitiated network forming materials. Rheology modifiers are intended to mean materials that change viscosity.

Since the preceramic polymer and/or a structure material is (are) substantially free of photocuring agents and rheology modifiers the material loading upon pyrolyzing can be very high. By volume percent the material loading upon pyrolyzing can comprise a ceramic material content of at least 97 vol %, at least 98 vol %, at least 99 vol %, or at least 99.5 vol %.

Since the preceramic polymer and/or a structure material is (are) substantially free of photocuring agents and rheology modifiers the porosity can be very low. By volume percent the porosity upon pyrolyzing can be not greater than 3 vol %, 2 vol %, 1 vol %, 0.5 vol %, or substantially free of porosity.

The interfacial tension and other rheological properties of the preceramic polymer and bath are important in the 3D printing process. Embodiments of this disclosure can use commercially available preceramic polymer, without changing the chemistry or composition. The properties of the preceramic polymer during the printing process are not controlled, and the polymer is physically extruded through the nozzle and dispensed into the bath. The support bath is shown in the inset in FIG. 3C. It is transparent, and free of any visible bubbles. When held upside down, the gel holds its shape without flowing, which shows its solid-like behavior in the absence of shear stress.

Figure 3C:
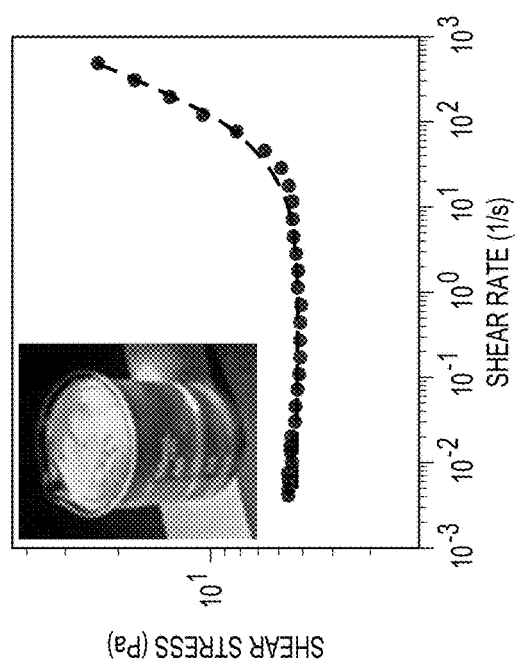

FIGS. 3B-3D show the rheological properties of the support bath. As mentioned above, the support bath was prepared by adding silica nanoparticles (with an average size of 200-300 nm) to the mineral oil to form a yield stress fluid. An ideal support bath should have characteristics of a solid to support the printed structure (during printing and also during thermal curing), as well as the characteristics of a fluid to enable nozzle movement with different speeds with minimal resistance. The yield stress fluid here serves as a support material that switches reversibly from a solid to a liquid when subjected to sufficiently high shear stress. During printing, the shear stress is provided by the nozzle motion. In the vicinity of the nozzle, the liquid phase precursor polymer is dispensed from the nozzle. In the wake of the nozzle, the bath is designed to turn into a "solid" state (after removal of the nozzle shear stress), maintaining the shape of the liquid precursor.

FIG. 3B shows the storage modulus (G') and the loss modulus (G") vs. frequency for the bath. G' vs. frequency remains flat and separated from the G", which is a characteristic of soft elastic solids with damping. The shear stress vs. shear rate shows a plateau for low shear rate (<~10/s) (FIG. 3C), which corresponds to the yield stress of the bath. For stress above this yield stress, the bath fluidizes or behaves like a fluid. The plateau region corresponds to shear rate independent stress dominated by elasticity. When the bath fluidizes for shear rate larger than the plateau region, its behavior is dominated by viscous loss. The Herschel-Bulkley model is commonly used to describe the behavior of yield stress fluids: $\sigma=\sigma_y+k\dot{\gamma}^n$, in which $\sigma_y$ is the yield stress, k is the consistency factor, and n is the flow index. For shear thinning fluids, n<1. Based on this model fitted to the data in FIG. 3C, the yield stress of the bath is ~5.1 Pa, the flow index and the consistency factors are 0.9 and 0.05, respectively. Given the low yield stress of the bath compared to the hydrostatic pressure at reasonable bath depth ($\rho gh$), there is no concern of static crevasse formation, since the hydrostatic pressure easily refills the fluid behind the nozzle. This is important to prevent flow of the preceramic polymer into this space, which will result in skewed printing geometries. The support-bath gel composition can be tuned by changing the silica nanoparticles concentration and the mineral oil type.

FIG. 3D shows the apparent steady-state shear viscosity of the support bath calculated from the ratio of the steady-state shear stress and shear rate. The response shows a shear thinning behavior. The viscosity decreases from ~$10^3$ Pa·s. to less than $10^{-1}$ Pa·s. over a shear rate range of $4\times10^{-3}$ $s^{-1}$ to 500 $s^{-1}$.

Embodiments of this disclosure can use commercially available preceramic polymers, without changing the chemistry or composition. The rheological properties of the bath and the preceramic polymer, the interfacial tension between the preceramic polymer and the bath, as well as printing rate (nozzle travel speed), and flow rate of the preceramic polymer in the nozzle overall determine the resolution and precision of the printing process. The cross-sectional area (A) of the extruded polymer from the nozzle is mostly determined by the flow rate (Q) and the travel velocity (V) of the nozzle (A=Q/V). The flow rate is controlled by a syringe pump. For these experiments, a flow rate of ~1 ml/min with a nozzle speed of ~15 mm/s was used. This results in a cross-sectional area of ~1.1 $mm^2$, which assuming a circular cross-section yields a diameter of d~1.2 mm. The diameter of the nozzle was ~0.6 mm. In various embodiments, nozzle diameters may be less than 0.5 mm, less than 0.7 mm, less than 1 mm, less than 1.5 mm or less than 2 mm. In yet other embodiments, it is conceived that nozzle diameters outside the range of 0.5 mm to 2 mm may be used depending upon the other parameters, such as nozzle speed. To prevent transient recirculating wake behind the nozzle, which can intermix the support bath material and the preceramic polymer, the nozzle speed must be kept below $$V \sim \frac{\rho g L d}{\eta},$$

in which $\rho$ is the density of the bath, L is the nozzle length immersed in the bath, d is the nozzle diameter, and $\eta$ is the bath viscosity[21]. In our experiment, the nozzle speed was well below the critical speed that would cause recirculating wake (~250 mm/s).

The instability caused by gravitational forces that result from density mismatch ($\Delta\rho$) between the support bath and the preceramic polymer solution may result in sink or rise of the printed structures in the bath. For a sphere with diameter d, the rise/sink speed ($V_{rs}$) can be found using $$V_{rs} \sim \frac{\Delta \rho g d^2}{18 \eta},$$

[21]. Assuming, a spherical geometry with the typical print cross-sectional area in this work (~1.2 mm), the sinking speed is estimated to be ~0.096 mm/s, which is rather small considering to the total printing duration. Given that the viscosity of the support bath depends on the shear rate (FIG. 3D), in this calculation, a viscosity under printing shear rate (~2 Pa·s) was used. In the absence of shear stress, the viscosity of the bath is more than $10^3$ Pa·s, and hence the sinking speed would be nearly zero, as expected for solid behavior of the bath. Obvious sinking or rising of the printed object in the support bath was not observed during printing or after curing. The minimum stable feature size ($I_c$) to prevent the Rayleigh instability that will cause breakup of the printed preceramic polymer in the bath can be estimated using $$I_c = \frac{\gamma_{oil-polymer}}{\sigma_y},$$

[21] in which $\gamma_{oil-polymer}$ is the interfacial tension between the bath and the preceramic polymer solution, and $\sigma_y$ is the yield stress of the bath (~5.1 Pa). However, the smallest stable feature size in our work was ~0.7 mm, without breakup of the printed polymer, and this is more attributed to the limitations of the printer and not the process itself.

Figure 4A:
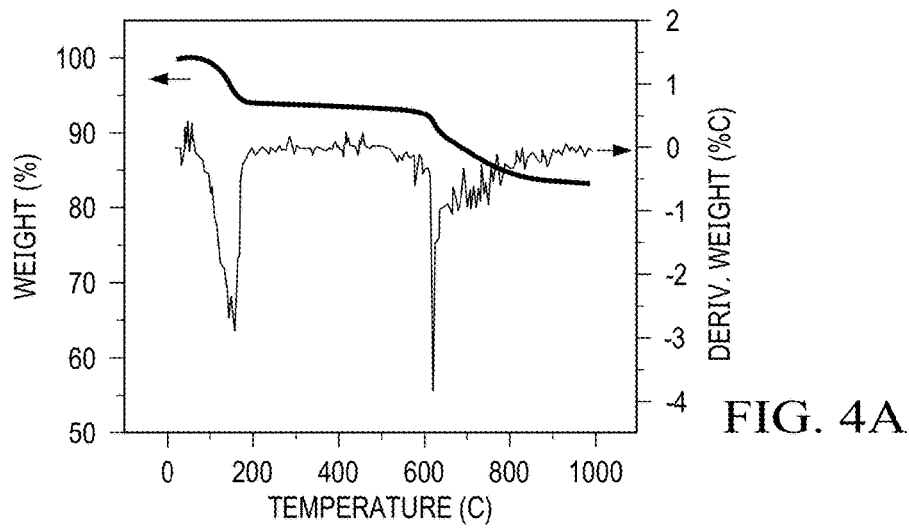
FIGS. 4A-4C illustrate thermal and mechanical properties.
Figure 4B:
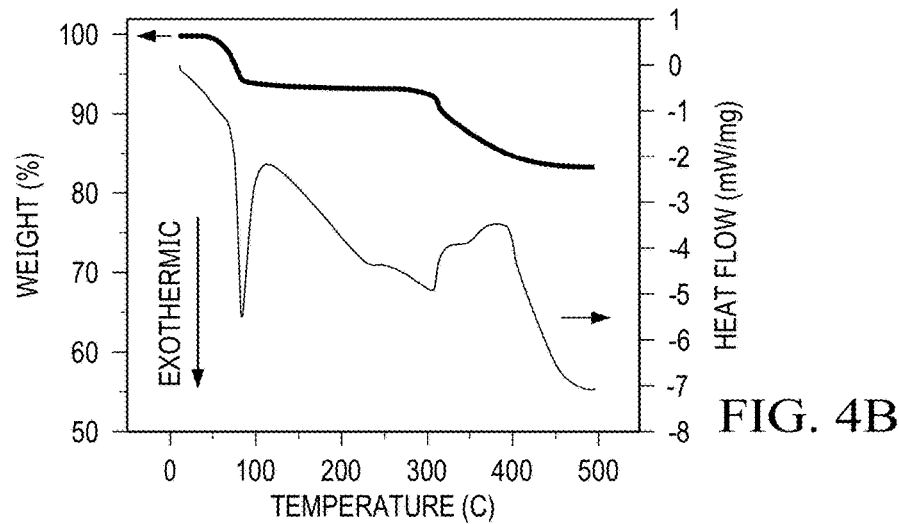
Figure 4C:
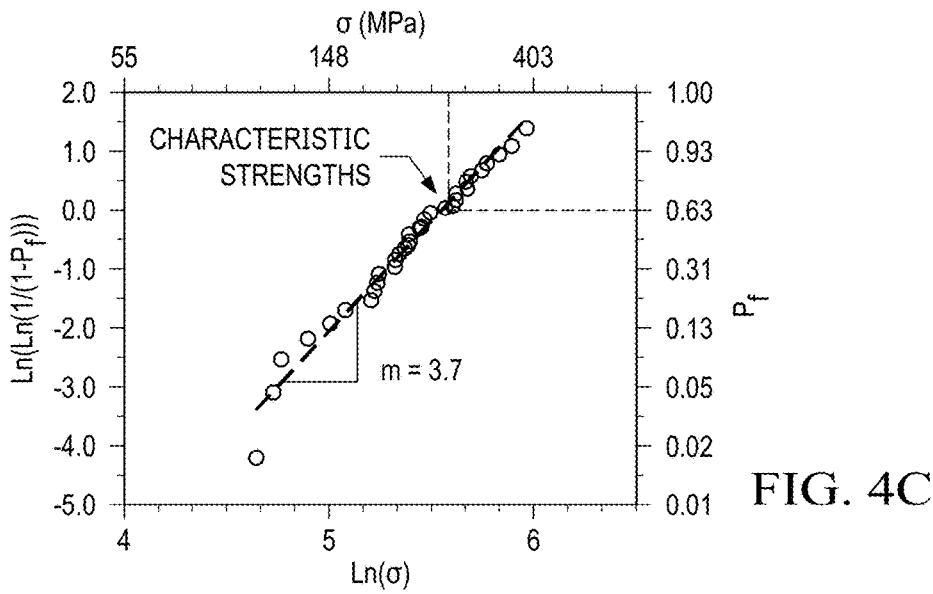
Figure 5:
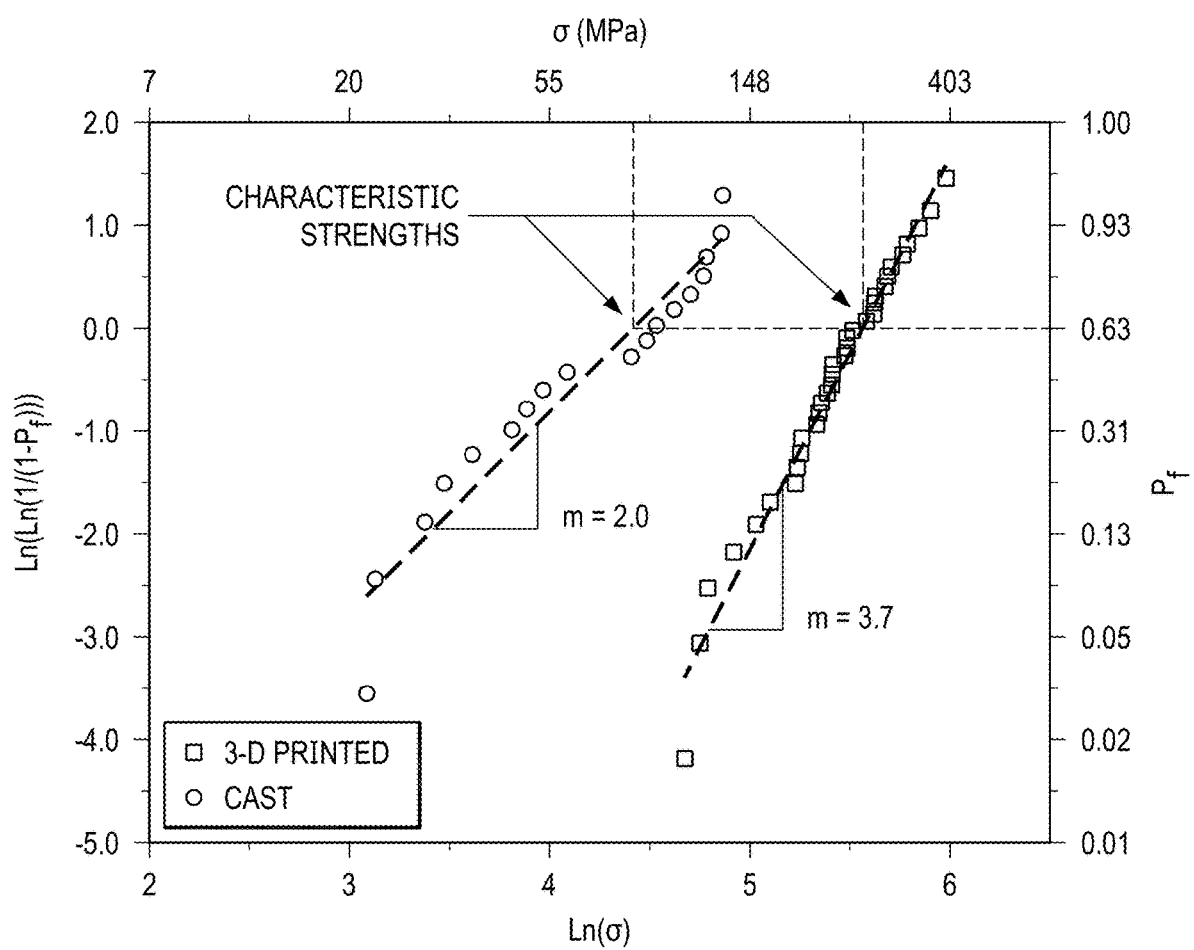
FIG. 5 illustrates the Weibull plot for the strength of 3D printed and casted ceramic. n=33 for 3D printed ceramic, and n=15 for cast ceramic.

The thermogravimetric analysis (TGA/DTG) combined with differential scanning calorimetry (DSC) was used to obtain insight into the thermally induced chemical changes of the material during processing[22]. The thermal analysis (TGA/DSC/DTG) was conducted at a heating rate of 20° C.·min$^{-1}$ under flowing $N_2$ atmosphere (see FIGS. 4A and 4B). According to thermal analysis experiments, the total mass loss of the preceramic polymer during ceramization (the process of turning into a ceramic) up to 1000° C. was 16.4%. The thermally-driven chemical crosslinking and pyrolysis leads to the observed mass loss through outgassing, which is also accompanied by material consolidation. The majority of the observed mass loss occurs at temperatures below 700° C. mainly within two temperature ranges. The first major mass loss occurs between 127° C.-233° C. (by ~2.9%, the peak rate at ~158° C.). This mass loss is accompanied by a strong exothermic peak at ~168° C. in the DSC spectra. This mass loss is attributed to chemical crosslinking during which the precursor is transformed into an infusible organic/inorganic molecular network. Generally, hydrosilylation, hydrolysis and condensation reactions are involved in the cross-linking stage of polymer-derived ceramics. The cross-linking is crucial to the formation of 3D structure of ceramic at higher heat treatment temperatures as it prevents the melting of the material during later stages. The cross-linking process also increases the ceramic yield since it prevents the loss and fragmentation of low molecular weight components of the precursor. In this work cross-linking was achieved using dicumyl peroxide[23].

The second major mass loss occurs in the temperature range of 593° C.-933° C. (by an additional ~3.9%, the peak rate at ~623° C.). Ceramization happens within this temperature range. Considerable bond cleavages and redistribution reactions between Si—H, Si—C, Si—O occurs in this temperature range[23, 24]. The broad endothermic peak observed in the DSC response at this temperature range represents the energy intake for bonds cleavage. The mass loss in this temperature range is due to the formation of a variety of hydrocarbons such as $CH_4$ and hydrogen, which are released from the material[23]. As a result of the cross-linking and pyrolysis reactions, the polymer derived ceramic material includes an amorphous SiOC network and free carbon (turbostratic domains) forms. Various catalysts can be used for cross-linking of the preceramic polymer. Type and the content of the added catalyst can affect the cross-linking process. This is because the crosslinking helps to preserve the precursor components with lower molecular weight during the ceramization step[23]. According to the recommendation of the supplier (Starfire), embodiments of this disclosure can use dicumyl peroxide as the catalyst. The mass loss of 16.4% in this experiment is much lower than previous study (30%) by Kulkarni on the same polymer (SPR-036), in which 100 mL/g of Pt catalyst was used[25]. Different mass loss ratios for the same precursor type can be attributed to different degrees of crosslinking during the early stages of heat treatment, as mediated for instance by the catalyst content.

Figure 6:
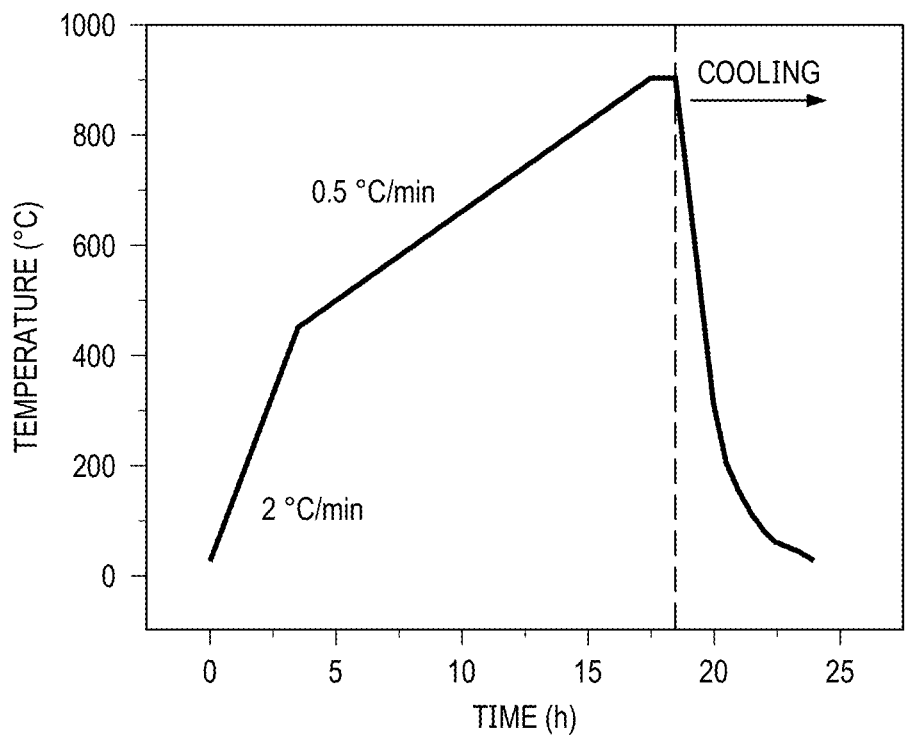
FIG. 6 illustrates a graph showing pyrolysis temperature—time profile.

Based on the thermal analysis results, a pyrolysis temperature—time profile was designed. FIG. 6 shows the pyrolysis temperature—time profile. The profile was obtained based on thermogravimetric analysis since the polymer precursor experiences two main mass losses during crosslinking and ceramization phases. The mass loss during ceramization is due to release of gasses from the precursor polymer. Rapid heat-up during the ceramization may lead to formation of defects and large pores. Hence, the heating rate in the temperature range of 450° C.-900° C. was chosen to be several times slower than the initial rate. The pyrolysis temperature—time cycle was as follows: from room temperature to 450° C. at a heating rate of 2° C./min, and from 450° C. to 900° C. at a heating rate of 0.5° C./min, followed by a hold at 900° C. for one hour.

Figure 7:
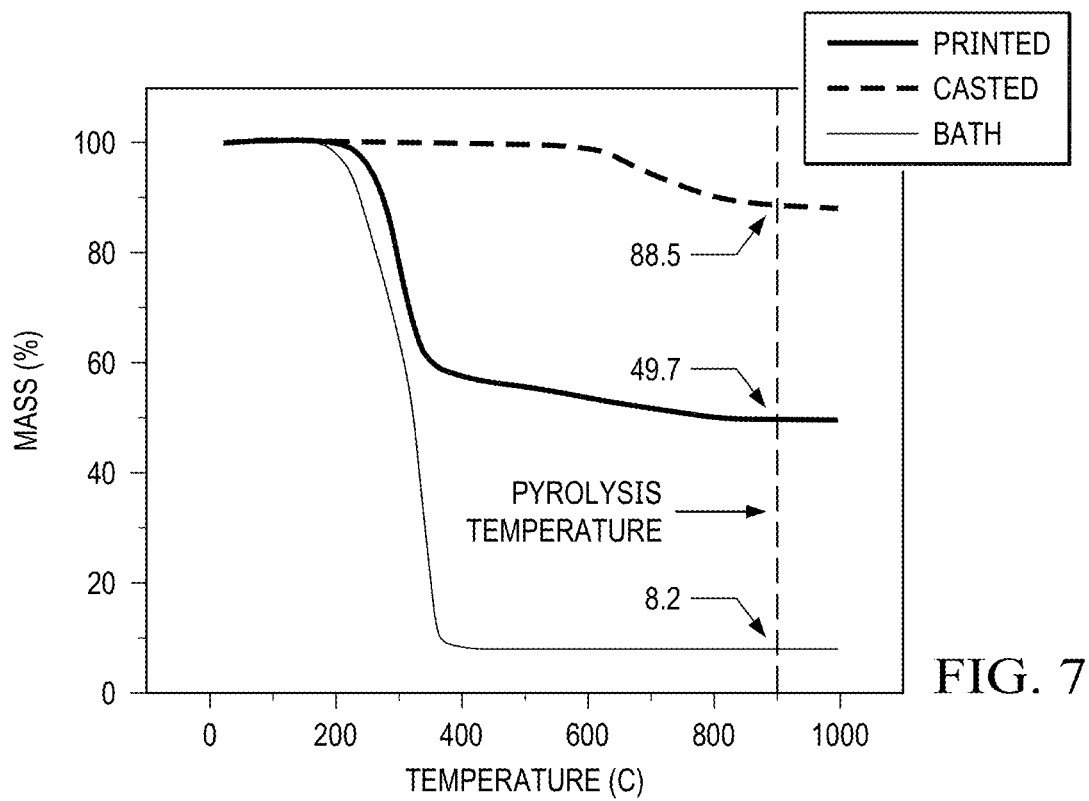
FIG. 7 illustrates a graph showing TGA response for the support bath, cross-linked cast material, and cross-linked printed-material.

A separate thermal analysis was conducted on the support bath, and cross-linked cast preceramic (as opposed to 3D-printed inside a support bath) and cross-linked 3D printed preceramic. Details of this analysis are given in the supplementary information in FIG. 7. FIG. 7 shows the TGA results for the support bath (8.2), cured casted-sample (88.5), and cured printed-sample (49.7). Cured here implies that the printed and cast samples were first cured and the thermal analysis was performed on the cured samples. This experiment was conducted to further understand the interaction between the support bath and the printed ceramic by considering the cast samples (free of support bath) as the control. The difference in the mass change between the cast and printed samples shows that even after rinsing with ethanol, a layer of mineral oil and silica nanoparticles remained on the surface of the printed parts. As it is shown in the TGA response of the bath (FIG. 7), the mineral oil almost entirely evaporates during pyrolysis, leaving behind the condensed silica nanoparticles that coat the surface of the pyrolyzed specimens. This is also confirmed by SEM images and EDS analysis in FIGS. 9A-9G, FIG. 10 and FIG. 13.

The support gel mass did not show significant change for temperature up to ~200° C., which shows that it is stable during curing process of the preceramic polymer at ~160° C. From 200° C. to 400° C., there was a drastic change in the mass of the support bath, which corresponded to the mineral oil evaporation (boiling point ~310° C.). The ~8 wt. % remaining mass after heating to a temperature of 1000° C. corresponds to ~5 wt. % silica nanoparticles in the bath composition and minor residues from mineral oil burning.

The cured-cast specimen does not show noticeable mass loss for temperature ~600° C. For higher temperature, up to 1000° C., there is a total mass loss of ~11.5%, which corresponds to ceramization. The cured-printed specimen shows an initial mass loss at similar temperature to the support bath, an indication that some residues of the support bath (mineral oil and silica nanoparticles) are left on the printed specimen after retrieval from the bath. The mineral oil part of this residue is evaporated in the process, leaving behind a coating of consolidated silica nanoparticles on the specimen. The thickness of this coating was estimated to be ~115 microns. For this estimation, several helices were printed and the mass of the extruded polymer was calculated based on the printing time and the flow rate in the nozzle. After curing, the mass of each printed-cured specimen was again measured. This was repeated for the pyrolyzed specimens. Given the density of the preceramic polymer solution (1.1 g/cm₃) and the density of the mineral oil (0.85 g/cm₃), the volume of the polymer and volume of the support bath residue was estimated, and the thickness of the oil coating on the cured sample was obtained.

Mechanical properties of the pyrolyzed 3D printed ceramic was obtained by 3-point flexure (bending) experiment. For comparison, mechanical properties of the cast specimens were also obtained. Details of the specimen preparation and testing procedure are presented in the materials and method section. For ceramics, the 3-point bending test is preferred to the commonly used compression test [26-28]. This is because the compression test tends to close the processing flaws (such as micro-crack and pores) in the material. However, during real-life applications, these processing flaws can be subjected to tensile loading. Compression test for ceramics does not truly examine such mechanical properties. A total of 33 3D-printed and 18 cast specimens were prepared according to the ASTM standard (C1684-18) [29].

Figure 8:
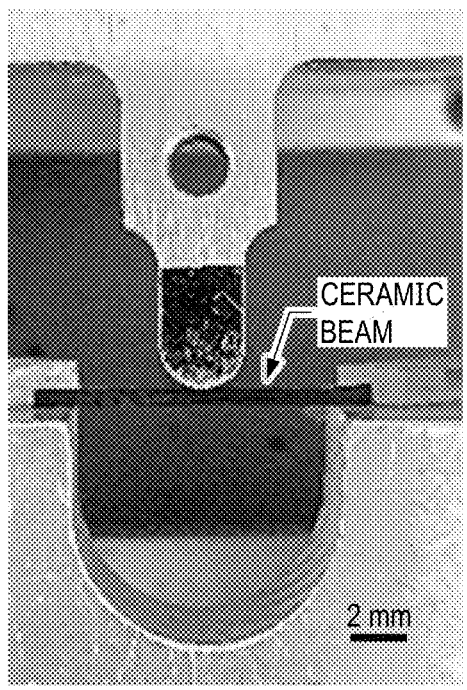
FIG. 8 illustrates an image of a 3D printed beam under 3-point bending test.

FIG. 8 shows a photograph of the ceramic beam under 3-point bending experiment mounted on a micro-tensile tester. FIG. 4D shows an SEM image a typical fracture surface of the ceramic. Brittle nature of the fracture can be observed in the smooth, and "shiny" surfaces. The strength of the ceramic under 3-point bending is expressed in terms of two-parameter Weibull distribution, shown in FIG. 4E, $$P_f = 1 - \exp\left(-\frac{\sigma}{\sigma_0}\right)^m. \qquad [31]$$

Such analysis considers the variability in the ceramic strength as a function of flaw population in the material [32]. m is the Weibull modulus, and $\sigma_0$ is the characteristic strength. Specimens' flexural strengths were ranked in an ascending order and assigned a probability using $P_f=(i-0.5)/n$, where n is the total number of specimens. Probabilities and the flexural strengths are presented in terms of $\ln(\ln(1/1-P_f))$ and $\ln(\sigma)$. Based on this analysis, the characteristic strength, which is the value of stress for $P_f=63.2\%$, for the 3D-printed and casted ceramics was calculated to be ~257 MPa and ~82 MPa, respectively. The linear regression of the flexural strength yields the Weibull modulus of m=3.7 for 3D-printed specimens and m=2.0 for cast specimens.

The Weibull modulus is the shape parameter that maps a failure probability of a specimen in a range of stress. If the strength measurement exhibits a low statistical variation, the Weibull modulus will be high, demonstrating that the strength can be presented as a single value to describe the specimen to specimen performance. On the contrary, if the measurement shows a high variation, the calculated Weibull modulus will be low, an indication that the flaws are distributed inconsistently. The calculated Weibull moduli indicate that the variation in strength measurement of cast specimens was slightly higher than 3D-printed ones, expressing a higher variability in flaws distribution in cast samples. The rigid walls of the casting mold may prevent material shrinkage during cross-linking and result in formation of micro-cracks and pores. In the 3D printed specimens, the soft support bath accommodates material's shrinkage, resulting is less processing flaws, and hence higher characteristic strength and lower strength variability between specimens. Similar argument can be made for escape of volatile species to the support bath in 3D printing process, as opposed to rigid walls of the casting mold. These are, in fact, advantages of 3D printing over casting.

The Weibull modulus and characteristic strengths for different types of ceramics such as SiSiC, SiCN, Si₃N₄, and SiOC have been reported in the literature having the values in the range of ~2.5-20 and ~190-1100 MPa, respectively [12, 31, 33-37]. The values largely depend on the specimen geometry and different processing, and as such comparison of absolute values may not be straightforward. For example, specimens made in the thin film form show larger characteristic strength given their small dimension and consequently smaller probability of flaws.

The mechanical properties of the ceramics largely depend on the specimen geometry and different processing used, and as such comparison of absolute values with other processes may not be straightforward. For example, specimens made in the thin film form show larger characteristic strength given their small dimension and consequently smaller probability of flaws. The thickness of the residual silica particles is estimated to be ~115 microns (supplementary information). In some embodiments this coating may not affect the mechanical properties of the specimens, although marginal. This is given its small thickness (~10% of the specimen diameter), and also given that silica has comparable mechanical properties to the polymer derived ceramic (SiOC). In other embodiments, the residual silica layer can be polished from the surface of the printed parts, if measurement of absolute mechanical properties is intended. For example, a large part can be printed, and then the silica coating can be polished, and then specimens can be cut from the polished material for mechanical properties measurements.

Figure 9A:
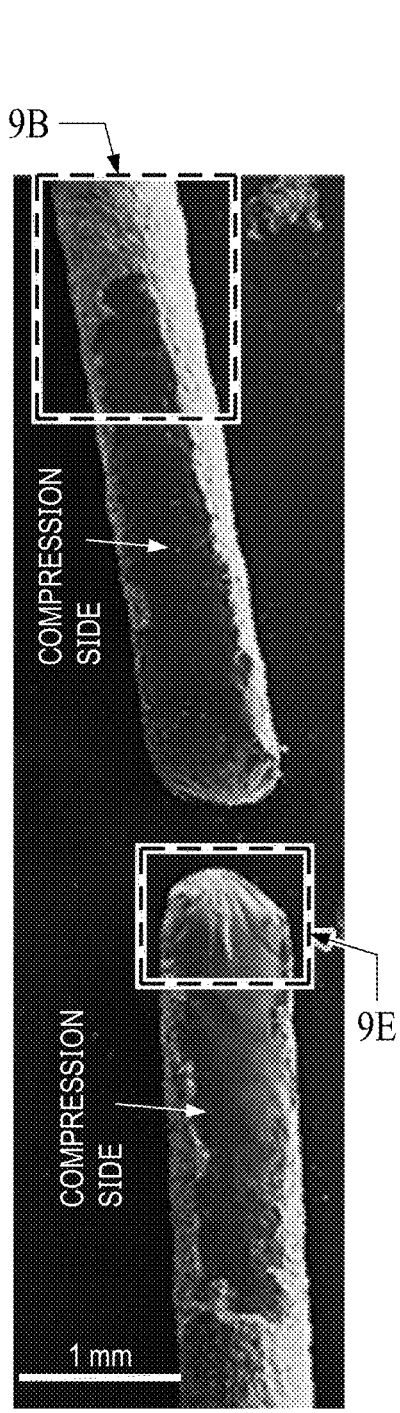
FIGS. 9A-9G illustrate SEM of the three-point bending specimen after failure.
Figure 9B:
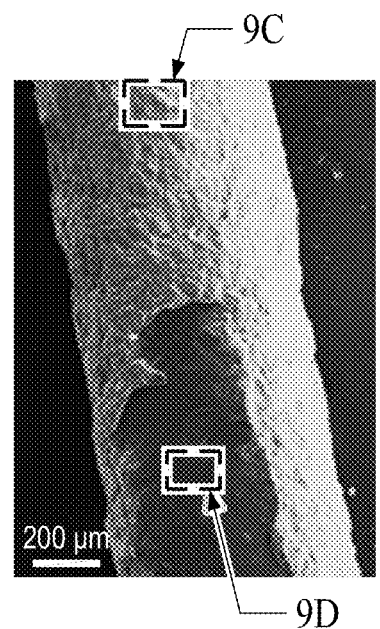
Figure 9C:
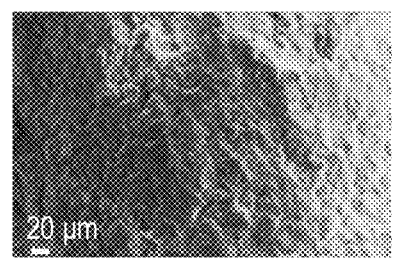
Figure 9D:
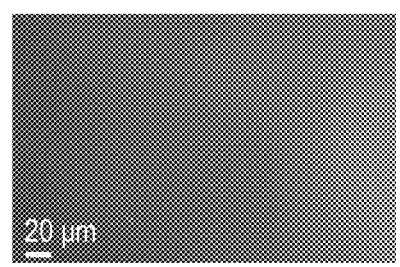
Figure 9E:
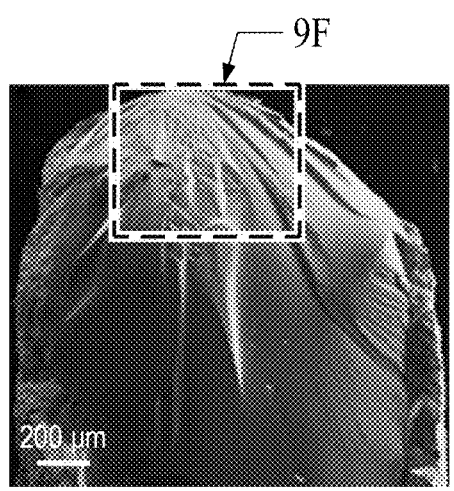
Figure 9F:
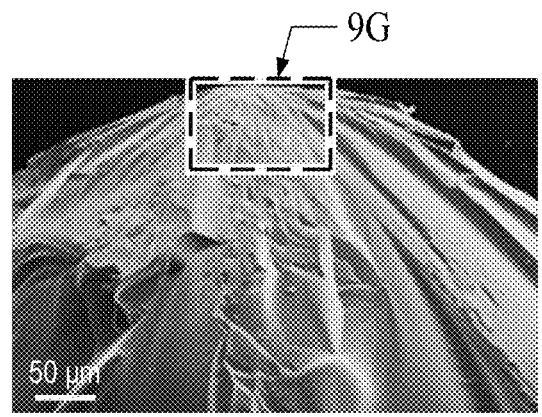
Figure 9G:
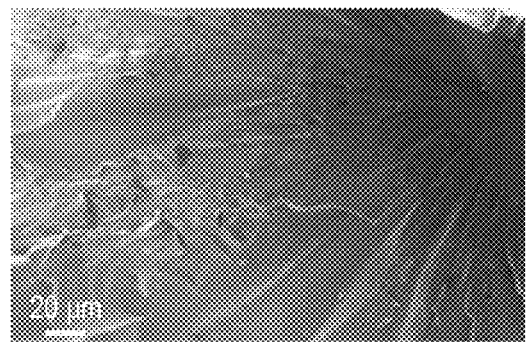
Figure 9H:
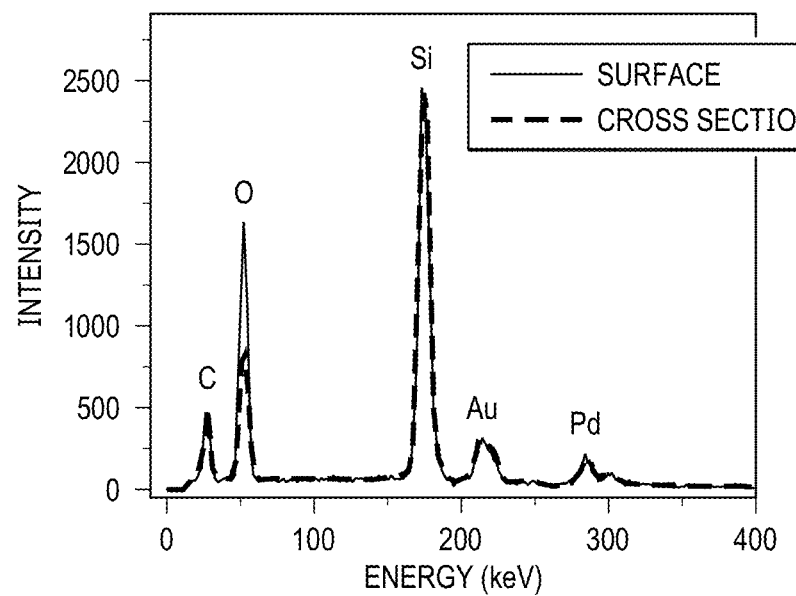
FIG. 9H is a graph of EDS spectra acquired from the cross-section and surface of the specimen.
Figure 10:
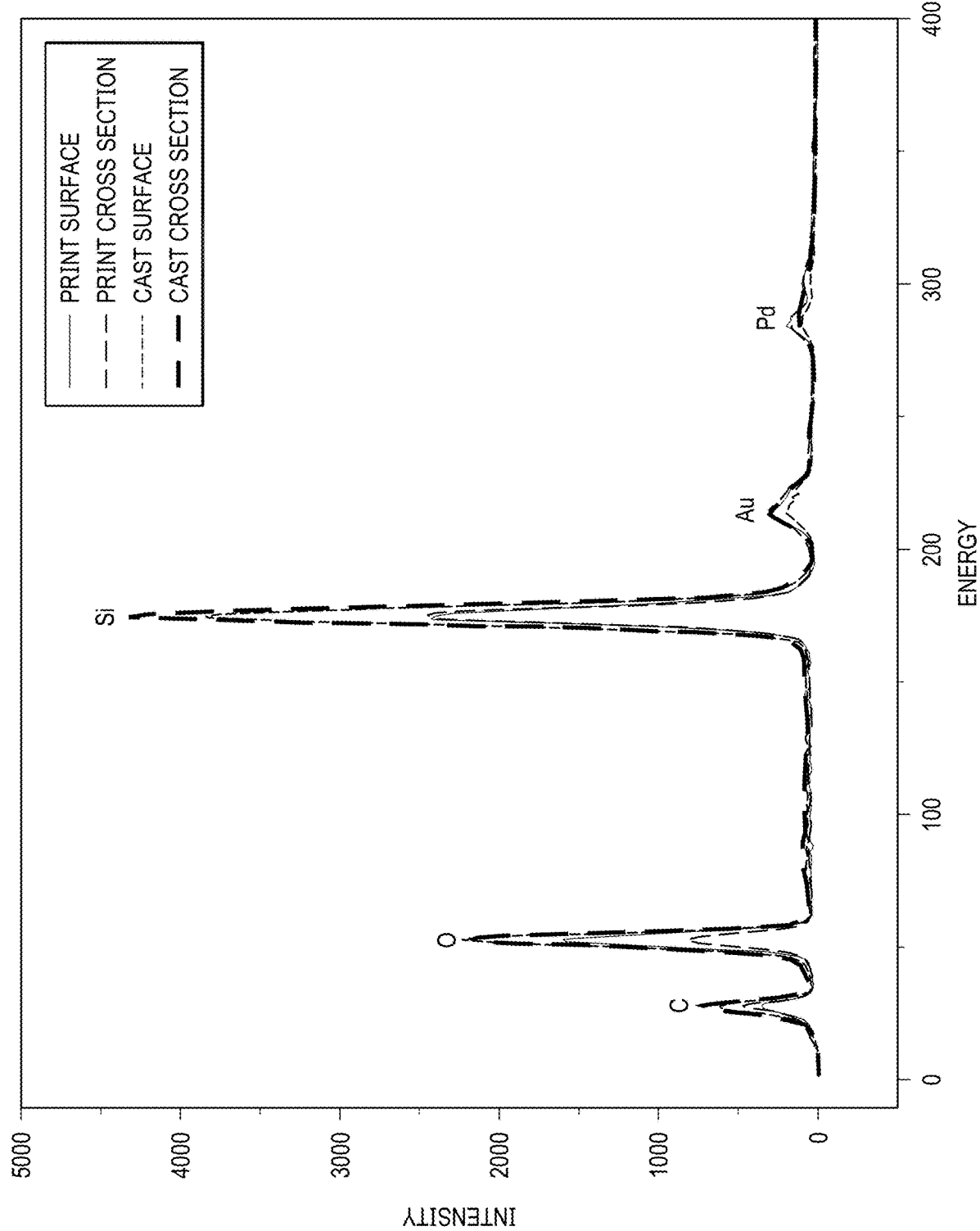
FIG. 10 illustrates a graph of EDS spectra of surface and cross-section of both 3D-printed and cast ceramic.

FIGS. 9A-9G show SEM images of a 3D-printed specimen after three-point bending experiment. FIG. 9A shows the two halves of the specimen after failure. FIGS. 9B-9D show the surface and the cross-section of the specimen. The image of the cross-section shows that the specimen is dense, without any noticeable pores and cracks at SEM image resolution. The rough surface morphology can be attributed to the residual silica and oil burn-out on the specimen, as discussed above, and revealed in the EDS spectra in FIG. 9H. The gold and palladium peaks were because of the sputtering process needed to enhance the electrical conductivity of the specimen before SEM/EDS analysis. FIG. 9A shows that the specimen failed on the tension-dominated side as expected for 3-point bending experiment. Magnified SEM images in FIGS. 9 E-9G show the brittle nature of the fracture with shiny and smooth surfaces covered with hackle lines radiating from the fracture origin.

The approximate composition of the 3D-printed specimens was obtained from EDS spectra (FIG. 10) and presented in FIG. 13. For comparison, EDS spectra of the cast specimens are also presented. There is a minor difference in the elemental composition between the surface and cross-section of the cast specimen, which can be attributed to minor oxidation on the surface. The much larger oxygen content on the printed specimen surface is attributed to the residual silica nanoparticles, as discussed above.

Figure 11A:
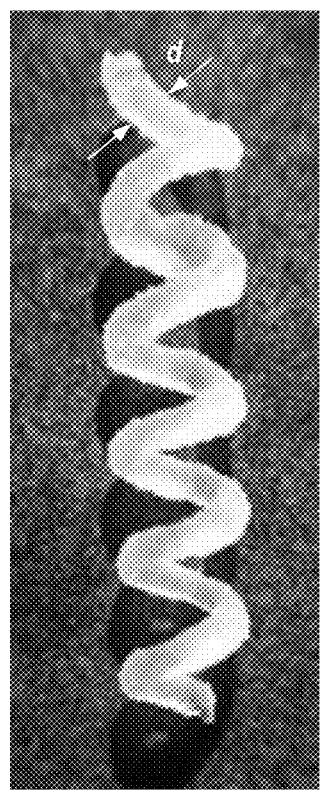
FIGS. 11A-11B illustrates a pair of side-by-side images showing a cured and pyrolyzed helix for shrinkage analysis after pyrolysis.
Figure 11B:
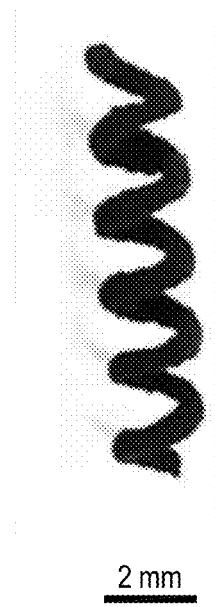

FIGS. 11A-11B shows side-by-side images of cross-linked and pyrolyzed specimens. The linear shrinkage (difference in the diameter d) was estimated to be ~15%. The shrinkage value was obtained using image analysis by subtracting the thickness of the residual oil. The 3D printed PDC had the ceramic yield ~84%. Using this data, the ratio of the density of the pyrolyzed to the cured ceramic was obtained as following:

$$\frac{\rho_{pyrolyzed}}{\rho_{cured}} = \frac{\left(\frac{m}{v}\right)_{pyrolyzed}}{\left(\frac{m}{v}\right)_{cured}} = \frac{0.84m}{(1-\text{linear shrinkage})^3} = \frac{0.84m}{0.85^3 v} = 1.37$$

Given the density of the preceramic polymer solution (1.1 g/cm3), the final density of the pyrolyzed ceramic is estimated to be ~1.6 g/cm3.

Example

A specific exemplary embodiment will now be further described by the following, nonlimiting example which serves to illustrate in some detail various features. The following example is included to facilitate an understanding of ways in which embodiments of the present disclosure may be practiced. However, it should be appreciated that many changes can be made in the exemplary embodiment which is disclosed while still obtaining like or similar results without departing from the scope of embodiments of the present disclosure. Accordingly, the example should not be construed as limiting the scope of the present disclosure.

Support bath preparation: The support bath was prepared by mixing 5 wt. % fumed silica with an average particle size in the range of ~200-300 nm (Sigma Aldrich) in 95 wt. % light mineral oil (VWR). The bath was hand-mixed until it turned into a clear gel. The air bubbles generated by mixing in the support bath were removed by exposing the bath to 2 h vacuum followed by resting at room temperature for 24 h.

Preceramic polymer solution preparation: A solution was prepared by mixing dicumyl peroxide (Sigma Aldrich) and toluene (Fisher Chemical) at 1:1 ratio. The solution was stirred for at least 2 minutes using a vortex mixer until all dicumyl peroxide particles completely dissolved in toluene. This solution was added to Polyramic SPR-036 (Starfire Systems) at 2:98 weight percent ratio. The solution was homogenously mixed using a magnetic stirrer for 5 minutes at 400 rpm. To prevent bubble formation during the curing process, the preceramic polymer solution was placed inside vacuum for 2 h.

Ceramic 3D printing in support bath: 3D printing was performed using a Delta-type 3D printer. The preceramic polymer solution was loaded into a syringe and injected by a NE-300 Just Infusion™ syringe pump. A sharp needle with an inner diameter of 0.024 inch was used as the nozzle. The nozzle motion was controlled via script functions and trajectory files. After printing, the precursor polymer was cured thermally at ~160° C. for two hours inside the same bath. After curing, the printed parts were readily retrieved from the bath. The parts were rinsed with running ethanol before pyrolysis. The pyrolysis process was performed using a tube furnace (Thermo Scientific Lindberg/Blue M Mini-Mite) inside a nitrogen gas environment. The pyrolysis time-temperature cycle was as following: room temperature to 450° C. at 2° C./min heating rate, 450° C. to 900° C. at 0.5° C./min heating rate, followed by hold at 900° C. for one hour.

Measurement of rheological properties: The rheological measurements were performed using an Anton Paar rheometer using a 50-mm cone with an apex angle of 0.5° and a 50-mm diameter bottom plate. Frequency sweeps were taken at 1% strain from $10^{-3}$ to $10^2$ Hz. The yield stress of the material was determined by applying a shear rate sweep from $4\times10^{-3}$ $s^{-1}$ to 500 $s^{-1}$. The viscosity value for the preceramic polymer solution was obtained from the vendor (Starfire Systems).

Mechanical characterization: The three-point flexural tests were performed using an MTI/Fullam SEMTester (MTI Instruments, Inc.). Referring to FIG. 8, the span length of the beam was 9.8 mm. The displacement speed of the head was set to 0.05 mm/min. Specimen dimension was according the ASTM standard (C1684-18). Based on the ASTM standard, the aspect ratio (length to width) of the test specimen should be more than three. For three-point bending tests, specimens were ~1 mm in diameter, ~15 mm in length.

DSC analysis: The polymer-to-ceramic transformation was investigated by differential scanning calorimetry/thermal gravimetric analysis (DSC/TGA) performed using a STA449/F5 Netzsch instrument. The thermal analysis was performed from room temperature up to 1000° C. with a heating rate of 20° C./min in a nitrogen gas environment.

SEM imaging: A Zeiss Supra 40 SEM was utilized to observe the cross-section of the ceramic specimens. Since a good electrical conductivity is required to obtain high quality SEM images, a gold-palladium films was sputtered on the ceramic specimens. The composition of the pyrolyzed SiOC ceramic was measured by EDAX material analysis system.

Casting: Since the precursor polymer was in solution phase, a mold was used to prepare casting specimens for comparison. Molds were prepared by making several cylindrical holes in PTFE (Polytetrafluoroethylene), which can withstand high temperature up to ~200° C. (≥crosslinking temperature).

The described embodiments and examples are illustrative only and not intended to be limiting. Although embodiments of the present disclosure can be implemented separately, embodiments of the present disclosure may be integrated into the system(s) with which they are associated. All the embodiments of the present disclosure disclosed herein can be made and used without undue experimentation in light of the disclosure. Embodiments of the present disclosure are not limited by theoretical statements (if any) recited herein. The individual steps of embodiments of the present disclosure need not be performed in the disclosed manner, or combined in the disclosed sequences, but may be performed in any and all manner and/or combined in any and all sequences. The individual components of embodiments of the present disclosure need not be formed in the disclosed shapes, or combined in the disclosed configurations, but could be provided in any and all shapes, and/or combined in any and all configurations. The individual components need not be fabricated from the disclosed materials, but could be fabricated from any and all suitable materials. Homologous replacements may be substituted for the substances described herein. Agents which are chemically related may be substituted for the agents described herein where the same or similar results would be achieved.

Various substitutions, modifications, additions and/or rearrangements of the features of embodiments of the present disclosure may be made without deviating from the scope of the underlying inventive concept. All the disclosed elements and features of each disclosed embodiment can be combined with, or substituted for, the disclosed elements and features of every other disclosed embodiment except where such elements or features are mutually exclusive. The scope of the underlying inventive concept as defined by the appended claims and their equivalents cover all such substitutions, modifications, additions and/or rearrangements.

The appended claims are not to be interpreted as including means-plus-function limitations, unless such a limitation is explicitly recited in a given claim using the phrase(s) "means for" or "mechanism for" or "step for". Sub-generic embodiments of this disclosure are delineated by the appended independent claims and their equivalents. Specific embodiments of this disclosure are differentiated by the appended dependent claims and their equivalents.

REFERENCES

1. Chen, Z.; Li, Z.; Li, J.; Liu, C.; Lao, C.; Fu, Y.; Liu, C.; Li, Y.; Wang, P.; He, Y., 3d Printing of Ceramics: A Review. *Journal of the European Ceramic Society* 2019, 39 (4), 661-687.
2. Zocca, A.; Colombo, P.; Gomes, C. M.; Gunster, J., Additive Manufacturing of Ceramics: Issues, Potentialities, and Opportunities. *Journal of the American Ceramic Society* 2015, 98 (7), 1983-2001.
3. Griffith, M. L.; Halloran, J. W., Freeform Fabrication of Ceramics Via Stereolithography. *Journal of the American Ceramic Society* 1996, 79 (10), 2601-2608.
4. Chartier, T.; Chaput, C.; Doreau, F.; Loiseau, M., Stereolithography of Structural Complex Ceramic Parts. *Journal of Materials Science* 2002, 37 (15), 3141-3147.
5. Lv, X.; Ye, F.; Cheng, L.; Fan, S.; Liu, Y., Binder Jetting of Ceramics: Powders, Binders, Printing Parameters, Equipment, and Post-Treatment. *Ceramics International* 2019, 45 (10), 12609-12624.
6. Bertrand, P.; Bayle, F.; Combe, C.; Goeuriot, P.; Smurov, I., Ceramic Components Manufacturing by Selective Laser Sintering. *Applied Surface Science* 2007, 254 (4), 989-992.
7. Shahzad, K.; Deckers, J.; Kruth, J.-P.; Vleugels, J., Additive Manufacturing of Alumina Parts by Indirect Selective Laser Sintering and Post Processing. *Journal of Materials Processing Technology* 2013, 213 (9), 1484-1494.
8. Franchin, G.; Wahl, L.; Colombo, P., Direct Ink Writing of Ceramic Matrix Composite Structures. *Journal of the American Ceramic Society* 2017, 100 (10), 4397-4401.
9. Colombo, P.; Mera, G.; Riedel, R.; Soraru, G. D., Polymer-Derived Ceramics: 40 Years of Research and Innovation in Advanced Ceramics. *Journal of the American Ceramic Society* 2010, 93 (7), 1805-1837.
10. Pham, T. A.; Kim, D. P.; Lim, T. W.; Park, S. H.; Yang, D. Y.; Lee, K. S., Three-Dimensional Sicn Ceramic Microstructures Via Nano-Stereolithography of Inorganic Polymer Photoresists. *Advanced Functional Materials* 2006, 16 (9), 1235-1241.
11. Martinez-Crespiera, S.; Ionescu, E.; Kleebe, H.-J.; Riedel, R., Pressureless Synthesis of Fully Dense and Crack-Free Sioc Bulk Ceramics Via Photo-Crosslinking and Pyrolysis of a Polysiloxane. *Journal of the European Ceramic Society* 2011, 31 (5), 913-919.
12. Shah, S. R.; Raj, R., Mechanical Properties of a Fully Dense Polymer Derived Ceramic Made by a Novel Pressure Casting Process. *Acta Materialia* 2002, 50 (16), 4093-4103.
13. Zanchetta, E.; Cattaldo, M.; Franchin, G.; Schwentenwein, M.; Homa, J.; Brusatin, G.; Colombo, P., Stereolithography of Sioc Ceramic Microcomponents. *Advanced Materials* 2016, 28 (2), 370-376.
14. Schwentenwein, M.; Homa, J., Additive Manufacturing of Dense Alumina Ceramics. *International Journal of Applied Ceramic Technology* 2015, 12 (1), 1-7.
15. Eckel, Z. C.; Zhou, C.; Martin, J. H.; Jacobsen, A. J.; Carter, W. B.; Schaedler, T. A., Additive Manufacturing of Polymer-Derived Ceramics. *Science* 2016, 351 (6268), 58-62.
16. Brigo, L.; Schmidt, J. E. M.; Gandin, A.; Michieli, N.; Colombo, P.; Brusatin, G., 3d Nanofabrication of Sioc Ceramic Structures. *Advanced Science* 2018, 5 (12), 1800937.
17. Hinton, T. J.; Jallerat, Q.; Palchesko, R. N.; Park, J. H.; Grodzicki, M. S.; Shue, H.-J.; Ramadan, M. H.; Hudson, A. R.; Feinberg, A. W., Three-Dimensional Printing of Complex Biological Structures by Freeform Reversible Embedding of Suspended Hydrogels. *Science Advances* 2015, 1 (9), e1500758.
18. O'Bryan, C. S.; Bhattacharjee, T.; Hart, S.; Kabb, C. P.; Schulze, K. D.; Chilakala, I.; Sumerlin, B. S.; Sawyer, W. G.; Angelini, T. E., Self-Assembled Micro-Organogels for 3d Printing Silicone Structures. *Science Advances* 2017, 3 (5), e1602800.
19. Bhattacharjee, T.; Zehnder, S. M.; Rowe, K. G.; Jain, S.; Nixon, R. M.; Sawyer, W. G.; Angelini, T. E., Writing in the Granular Gel Medium. *Science Advances* 2015, 1 (8), e1500655.
20. Lindahl, J.; Hassen, A.; Romberg, S.; Hedger, B.; Hedger Jr, P.; Walch, M.; DeLuca, T.; Morrison, W.; Kim, P.; Roschli, A.; Nuttall, D.; Czachowski, J.; Post, B.; Love, L.; Kunc, V. In *Large-Scale Additive Manufacturing with Reactive Polymers*, United States, 2018-10-01; United States, 2018.
21. O'Bryan, C. S.; Bhattacharjee, T.; Niemi, S. R.; Balachandar, S.; Baldwin, N.; Ellison, S. T.; Taylor, C. R.; Sawyer, W. G.; Angelini, T. E., Three-Dimensional Printing with Sacrificial Materials for Soft Matter Manufacturing. *MRS Bulletin* 2017, 42 (8), 571-577.
22. Li, J.; Lu, K.; Lin, T.; Shen, F., Preparation of Micro-/Mesoporous Sioc Bulk Ceramics. *Journal of the American Ceramic Society* 2015, 98 (6), 1753-1761.

23. Ionescu, E.; Kleebe, H. J.; Riedel, R., Silicon-Containing Polymer-Derived Ceramic Nanocomposites (Pdc-Ncs): Preparative Approaches and Properties. *Chem Soc Rev* 2012, 41 (15), 5032-5052.
24. Li, J. K.; Lu, K.; Lin, T. S.; Shen, F. Y., Preparation of Micro-/Mesoporous Sioc Bulk Ceramics. *Journal of the American Ceramic Society* 2015, 98 (6), 1753-1761.
25. Kulkarni, A.; Soraru, G.; Pearce, J., Polymer-Derived Sioc Replica of Material Extrusion-Based 3-D Printed Plastics. 2020, 32, 100988.
26. Jiang, H.; Wang, X.-H.; Lei, W.; Fan, G.-F.; Lu, W.-Z., Effects of Two-Step Sintering on Thermal and Mechanical Properties of Aluminum Nitride Ceramics by Impedance Spectroscopy Analysis. *Journal of the European Ceramic Society* 2019, 39 (2-3), 249-254.
27. Tian, X.; Yan, K.; Liu, H.; Zhao, J.; Yang, J., Effect of Co on Thermal and Mechanical Properties of Si3n4 Based Ceramic Tool Material. *Ceramics International* 2019, 45, 19435-19441.
28. Yuan, Q.; Chai, Z. F.; Huang, Z. R.; Huang, Q., A New Precursor of Liquid and Curable Polysiloxane for Highly Cost-Efficient Sioc-Based Composites. *Ceramics International* 2019, 45 (6), 7044-7048.
29. ASTM, Standard Test Method for Flexural Strength of Advanced Ceramics at Ambient Temperature-Cylindrical Rod Strength. In C1684-18, American Society of Testing Materials: 2019.
30. Astm C1239-13 (2018): Standard Practice for Reporting Uniaxial Strength Data and Estimating Weibull Distribution Parameters for Advanced Ceramics.
31. Khalili, A.; Kromp, K., Statistical Properties of Weibull Estimators. *Journal of materials science* 1991, 26 (24), 6741-6752.
32. Quinn, J. B.; Quinn, G. D., A Practical and Systematic Review of Weibull Statistics for Reporting Strengths of Dental Materials. *dental materials* 2010, 26 (2), 135-147.
33. Bakumov, V., et al., Mechanical and tribological properties of polymer-derived Si/C/N sub-millimetre thick miniaturized components fabricated by direct casting. Journal of the European Ceramic Society, 2012. 32(8): p. 1759-1767.
34. Sasikumar, P. V. W., et al., Polymer derived silicon oxycarbide ceramic monoliths: Microstructure development and associated materials properties. Ceramics International, 2018. 44(17): p. 20961-20967.
35. Zocca, A., et al., Additive manufacturing of SiSiC by layerwise slurry deposition and binder jetting (LSD-print). Journal of the European Ceramic Society, 2019.
36. Danzer, R., et al., Fracture statistics of ceramics-Weibull statistics and deviations from Weibull statistics. Engineering Fracture Mechanics, 2007. 74(18): p. 2919-2932.
37. Zhou, J., et al., Mechanical and Dielectric Properties of Two Types of Si3N4 Fibers Annealed at Elevated Temperatures. Materials, 2018. 11(9): p. 1498.

What is claimed is:

1. A method for fabricating a structure having at least two dimensions, the method comprising: providing support material within which the structure is fabricated; wherein the provided support material is stationary at an applied shear stress level below a threshold shear stress level and flows at an applied shear stress level at or above the threshold shear stress level during fabrication of the structure; and wherein the provided support material is configured to mechanically support at least a portion of the structure and to prevent deformation of the structure during the fabrication of the structure; depositing, into the support material, structure material to form the fabricated structure, wherein the structure material comprises a preceramic polymer material, wherein the depositing comprises applying a shear stress level above the threshold shear stress level to a portion of the support material; wherein the deposited structure material is suspended in the support material at a location where the structure material is deposited; wherein the structure material comprises a fluid that transitions to a solid or semi-solid state after deposition of the structure material; and wherein the structure material is substantially free of photocuring agents and rheology modifiers; heating simultaneously both the structure material and the support material to a temperature greater than or equal to ~160° C. and less than ~200° C. comprising one-step thermal cross-linking of the structure material; and retrieving the fabricated structure from the support material.

2. The method of claim 1, further comprising heating the structure material comprising pyrolysis of the structure material at a rate of <2 C/min to a temperature greater than or equal to 900° C.

3. The method of claim 1, wherein the support material comprises a shear stress (Pa) vs shear rate (1/s) having a low shear rate plateau for shear rate <~10 s-1 and a support material viscosity drops by 1,000 times upon increasing shear rate from 0.01/s to 100/s.

4. The method of claim 1, wherein the support material comprises silica nanoparticles and mineral oil.

5. The method of claim 4, wherein the silica nanoparticles comprise fumed silica.

6. The method of claim 4, wherein the silica nanoparticles comprise an average size of 200-300 nm.

7. A method, comprising:
3D printing a preceramic polymer material within a support bath comprising a thixotropic gel; to form a shape; then
curing the preceramic polymer material while the preceramic polymer material is still in the support bath comprising heating simultaneously both the preceramic polymer material and the thixotropic gel to a temperature greater than or equal to ~160° C. and less than ~200° C. comprising one-step thermal cross-linking of the preceramic polymer material; and then
retrieving the shape from the support bath,
wherein the preceramic polymer material is substantially free of photocuring agents and rheology modifiers.

8. The method of claim 7, wherein the preceramic polymer material is substantially free of photocuring agents and rheology modifiers.

9. The method of claim 7, wherein the shape is substantially free of photocuring agents and rheology modifiers.

10. The method of claim 7, further comprising, after retrieving, rinsing the shape.

11. The method of claim 10, further comprising, after rinsing, pyrolyzing the shape at a rate of <2 C/min to a temperature greater than or equal to ~900° C. to produce a polymer derived ceramic.

12. The method of claim 7, wherein the thixotropic gel comprises mineral oil and silica nanoparticles.

13. The method of claim 12, wherein the silica nanoparticles comprise fumed silica.

14. A method, comprising:
3D printing a preceramic polymer material within a support bath comprising a thixotropic gel; to form a shape; then
curing the preceramic polymer material while the preceramic polymer material is still in the support bath comprising heating simultaneously both the preceramic polymer material and the thixotropic gel to a temperature greater than or equal to ~160° C. and less than ~200° C. comprising one-step thermal cross-linking of the preceramic polymer material; then retrieving the shape from the support bath; then rinsing the shape; and then pyrolyzing the shape at a rate of <2 C/min to a temperature greater than or equal to ~900° C. to produce a polymer derived ceramic, wherein the preceramic polymer material is substantially free of photocuring agents and rheology modifiers, wherein the shape is substantially free of photocuring agents and rheology modifiers, wherein the support bath has a shear stress (Pa) vs shear rate (1/s) having a low shear rate plateau for shear rate <~10 s-1 and a support bath viscosity drops by 1,000 times upon increasing shear rate from 0.01/s to 100/s, wherein the support bath comprises silica nanoparticles and mineral oil, and wherein the silica nanoparticles have an average size of 200-300 nm.

* * * * *